United States Patent
Seaman et al.

(10) Patent No.: US 10,704,627 B2
(45) Date of Patent: Jul. 7, 2020

(54) MULTI-PIECE ROTOR FOR USE WITH AN ELECTRIC WHEEL END DRIVE MOTOR

(71) Applicant: Bendix Spicer Foundation Brake LLC, Elyria, OH (US)

(72) Inventors: James Seaman, Avon, OH (US); Manouchehr Sabeti, Avon, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 96 days.

(21) Appl. No.: 16/008,244

(22) Filed: Jun. 14, 2018

(65) Prior Publication Data

US 2019/0383340 A1  Dec. 19, 2019

(51) Int. Cl.
| | |
|---|---|
| *F16D 65/12* | (2006.01) |
| *F16D 65/00* | (2006.01) |
| *F16D 65/02* | (2006.01) |
| *H02K 5/10* | (2006.01) |
| *H02K 7/00* | (2006.01) |
| *H02K 9/02* | (2006.01) |
| *B60K 7/00* | (2006.01) |
| *F16D 55/22* | (2006.01) |

(52) U.S. Cl.
CPC ....... *F16D 65/123* (2013.01); *F16D 65/0056* (2013.01); *F16D 65/02* (2013.01); *F16D 65/128* (2013.01); *H02K 5/10* (2013.01); *H02K 7/006* (2013.01); *H02K 9/02* (2013.01); *B60K 7/0007* (2013.01); *B60K 2007/0092* (2013.01); *F16D 55/22* (2013.01); *F16D 2065/1312* (2013.01); *F16D 2065/1328* (2013.01); *F16D 2065/1384* (2013.01)

(58) Field of Classification Search
CPC .. F16D 65/123; F16D 65/0056; F16D 65/128; F16D 65/02; F16D 55/22
See application file for complete search history.

(56) References Cited

U.S. PATENT DOCUMENTS

| | | |
|---|---|---|
| 1,198,314 A | 9/1916 | Baude |
| 2,869,688 A | 1/1959 | Busch |

(Continued)

FOREIGN PATENT DOCUMENTS

| | | |
|---|---|---|
| CN | 201554802 U | 8/2010 |
| CN | 101865223 A | 10/2010 |

(Continued)

*Primary Examiner* — Xuan Lan Nguyen
(74) *Attorney, Agent, or Firm* — Crowell & Moring LLP

(57) ABSTRACT

A brake disc arrangement to be located at an end of an axle of a vehicle driven by an electric motor includes a rotor assembly having multiple rotor assembly pieces joined together with fasteners, as well as an adaptor. The pieces mentioned include rotor sections defining an engagement portion having surfaces to be contacted by friction pads. The rotor assembly also includes an attachment base and an intermediate section, surrounding a rotor assembly axis of rotation, extending along the rotor assembly axis of rotation between the engagement portion and the attachment base. When assembled, the adaptor extends between a wheel hub base and the attachment base of the rotor assembly so that the rotor assembly is securable to the wheel hub. The adaptor defines an internal volume within which a housing for the electric motor and at least a portion of the wheel hub are receivable.

21 Claims, 8 Drawing Sheets

(56) References Cited

U.S. PATENT DOCUMENTS

| | | | |
|---|---|---|---|
| 3,314,509 A | 4/1967 | Pelikan | |
| 3,933,228 A | 1/1976 | Otto et al. | |
| 4,120,386 A | 10/1978 | Airheart | |
| 5,085,295 A | 2/1992 | Wautelet et al. | |
| 5,864,935 A | 2/1999 | Baumgartner et al. | |
| 7,017,718 B2 * | 3/2006 | Gotti | F16D 65/123 |
| | | | 188/218 XL |
| 9,073,425 B2 | 7/2015 | Vogler et al. | |
| 9,403,429 B2 * | 8/2016 | Baumgartner | B60K 7/0007 |
| 2004/0124046 A1 * | 7/2004 | Hayes | F16D 65/0006 |
| | | | 188/218 XL |
| 2011/0162925 A1 | 7/2011 | Mueller | |
| 2014/0232175 A1 * | 8/2014 | Yamamoto | B60K 17/046 |
| | | | 301/6.5 |
| 2016/0102719 A1 * | 4/2016 | Watarai | F16D 65/128 |
| | | | 188/218 XL |

FOREIGN PATENT DOCUMENTS

| | | |
|---|---|---|
| CN | 202215642 U | 5/2012 |
| CN | 105114492 A | 12/2015 |
| CN | 105114493 A | 12/2015 |
| CN | 204852100 U | 12/2015 |
| CN | 106812835 A | 6/2017 |
| DE | 195 27 173 A1 | 2/1996 |
| DE | 298 23 371 U1 | 10/1999 |
| DE | 10 2008 042 173 A1 | 3/2010 |
| FR | 2 626 637 A1 | 8/1989 |
| WO | WO 89/05925 A1 | 6/1989 |
| WO | WO 03/002885 A1 | 1/2003 |

* cited by examiner

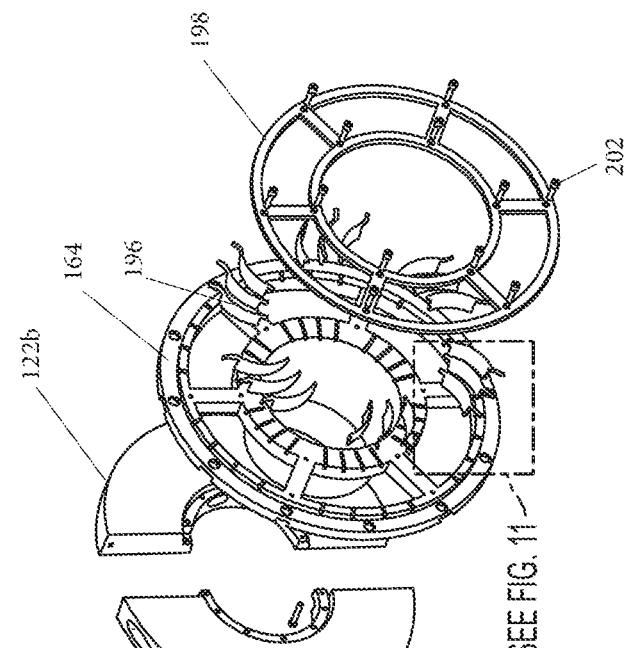
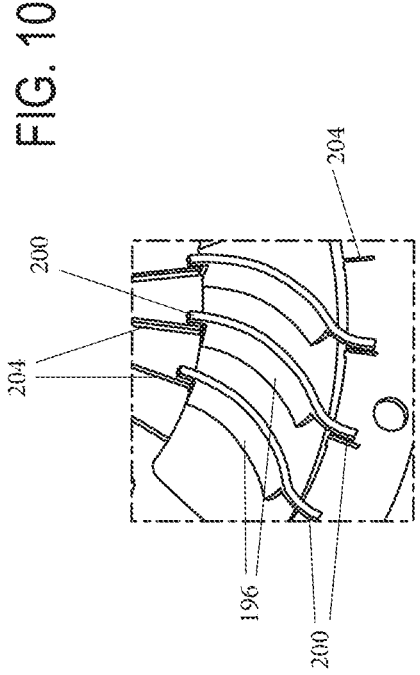
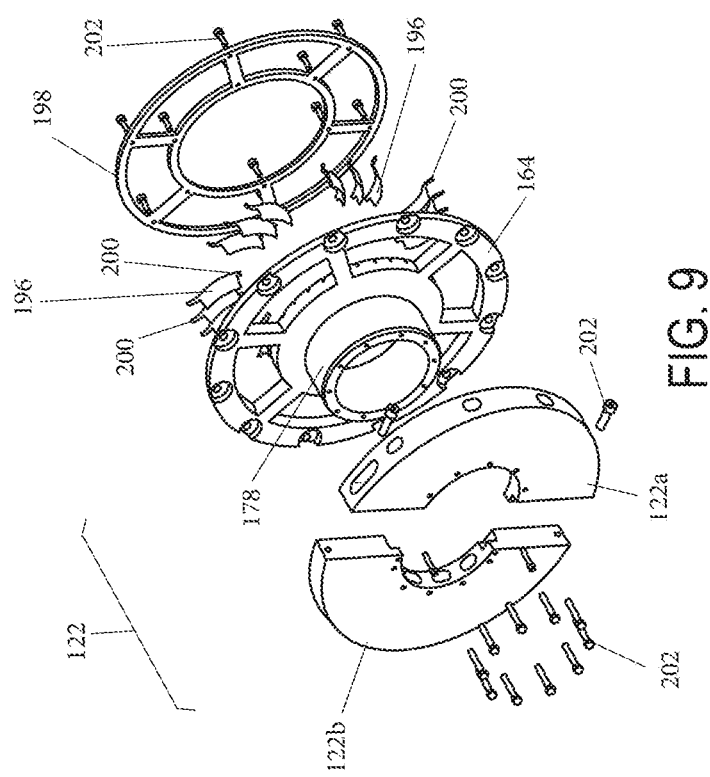
FIG. 9
FIG. 10
FIG. 11

MULTI-PIECE ROTOR FOR USE WITH AN ELECTRIC WHEEL END DRIVE MOTOR

BACKGROUND OF THE INVENTION

1. Field of the Invention

New developments in electric motor driven trucks and electric motor transportation of other types have opened up the possibility of using multiple small electric motors to independently power and brake each wheel. These systems have the possibility of reducing the vehicle weight and, in turn, increasing cargo capacity. For safety concerns, a redundant air power braking method is still required. An arrangement for incorporating a multi-piece brake rotor, permitting such redundant braking, with an electric motor and other elements at an end of a vehicle axle is disclosed.

2. Description of Related Art

U.S. Patent Application Publication 2004/0124046 A1 to Hayes et al. discloses a separable brake rotor having rotor portions mountable to a hub having extensions by way of threaded fasteners.

German language publication DE 298 23 371 U1 to Knorr-Brume Syeteme für Nutzfahrzeuge GmbH discloses a two-piece brake disc for a commercial vehicle disc brake.

Other documents concerning multi-part brake rotors or multi-part discs exist as well, including U.S. Pat. No. 1,198,314 to Baude, U.S. Pat. No. 2,869,688 to Busch, U.S. Pat. No. 3,314,509 to Pelikan, U.S. Pat. No. 3,933,228 to Otto et al., U.S. Pat. No. 4,120,386 to Airheart, U.S. Pat. No. 5,864,935 to Baumgartner et al., German language publications DE 195 27 173 A1 to Berneiser et al. and DE 10 2008 042 173 A1 to Mueller, international PCI publications WO 89/05925 to Dennis and WO 03/002885 A1 to Gotti et al., French publication 2 626 637 A1 to Wautelet et al., and Chinese publications 101865223 A to Yue Chen et al., 105114492 A and 105114493 A, both to Zeng Qifu, 106812835 A to Chen Guozian et al. 201554802 U to Xinji Su, 202215642 U to Kuncai Qian et al., and 204852100 U, again to Zeng Qifu.

U.S. Pat. No. 9,073,425 B2 to Volger et al. concerns a wheel hub drive system with an electric motor that can be arranged inside a wheel rim.

SUMMARY OF THE INVENTION

To improve efficiency of an individual wheel electric motor system, the ideal location for an electric motor of the type mentioned is immediately next to the wheel hub. Anything inboard of the motor will not rotate, so the brake needs to be able to be connected to the hub while still packaging around the motor. Additionally, the life of the rotor is shorter than that of the hub or motor. As such, the ability to remove and refurbish or replace the rotor without removing the hub or motor is desired. Designing a larger diameter introduces possibility of new ground clearance concerns, given that the current rotor "packages" inside the wheel rim. One challenge addressed by the present invention is to improve system efficiency by having the motor located in its ideal location while, at the same time, facilitating rotor removal and repair or replacement without requiring hub or motor removal.

According to the invention, this challenge is met by way of a brake disc arrangement to be located at an end of an axle of a vehicle driven by an electric motor that is disposed adjacent to a wheel hub of the vehicle. The brake disc arrangement provides for braking an individual vehicle wheel to be driven by the electric motor, and includes a rotor assembly having multiple rotor assembly pieces, joined together with fasteners, as well as an adaptor. The multiple rotor assembly pieces include rotor sections defining an engagement portion having surfaces to be contacted by friction pads, and, in addition to the engagement portion, the rotor assembly includes an attachment base and an intermediate section, surrounding a rotor assembly axis of rotation, extending along the rotor assembly axis of rotation between the engagement portion and the attachment base. When assembled, the adaptor extends between a base of the wheel hub and the attachment base of the rotor assembly so that, by way of the adaptor, the rotor assembly is securable to the wheel hub. The adaptor defines an internal volume within which a housing for the electric motor and at least a portion of the wheel hub are receivable.

In one arrangement, the rotor assembly pieces include a pair of rotor assembly halves, with each of said rotor assembly halves integrally formed with halves of said attachment base and said intermediate section, while, in another arrangement, each of the rotor assembly halves is attached by fasteners to the intermediate section and the attachment base. Rotor blades may be secured to the attachment base, for example, by way of a retaining ring serving to claim the blades against the attachment base. In this case, each of the rotor blades may include at least one tab by which the rotor blades may be clamped by the retaining ring against the attachment base. In another arrangement, the rotor blades may form part of an integrally formed, single element connected to the attachment base.

When the rotor is mounted, in one configuration, the wheel hub is sandwiched between a rim of the individual vehicle wheel to be driven by the electric motor and an axial end of the adaptor. As an alternative, however, the adaptor can include an end flange that is sandwiched between the base of the wheel hub and a ring of the individual vehicle wheel to be driven by the electric motor. In preferred embodiments, at least one of the rotor assembly and the adaptor is slotted to reduce weight and for ventilation around the motor received within the envelope or housing to improve cooling. The invention additionally concerns a vehicle incorporating a brake disc arrangement such as that mentioned, as well as a process of assembling that brake disc arrangement.

BRIEF DESCRIPTION OF THE DRAWINGS

FIG. 9 is an exploded view showing separate components of a rotor and a rotor base, together forming much of the rotor assembly, as well as rotor blades, a rotor blade retaining ring, and fasteners used to secure the separate components together.

FIG. 10 is a view similar to FIG. 9 but showing the components from a different angle.

FIG. 11 is an enlarged view of a portion of FIG. 10.

DETAILED DESCRIPTION OF THE INVENTION

Figure 1:
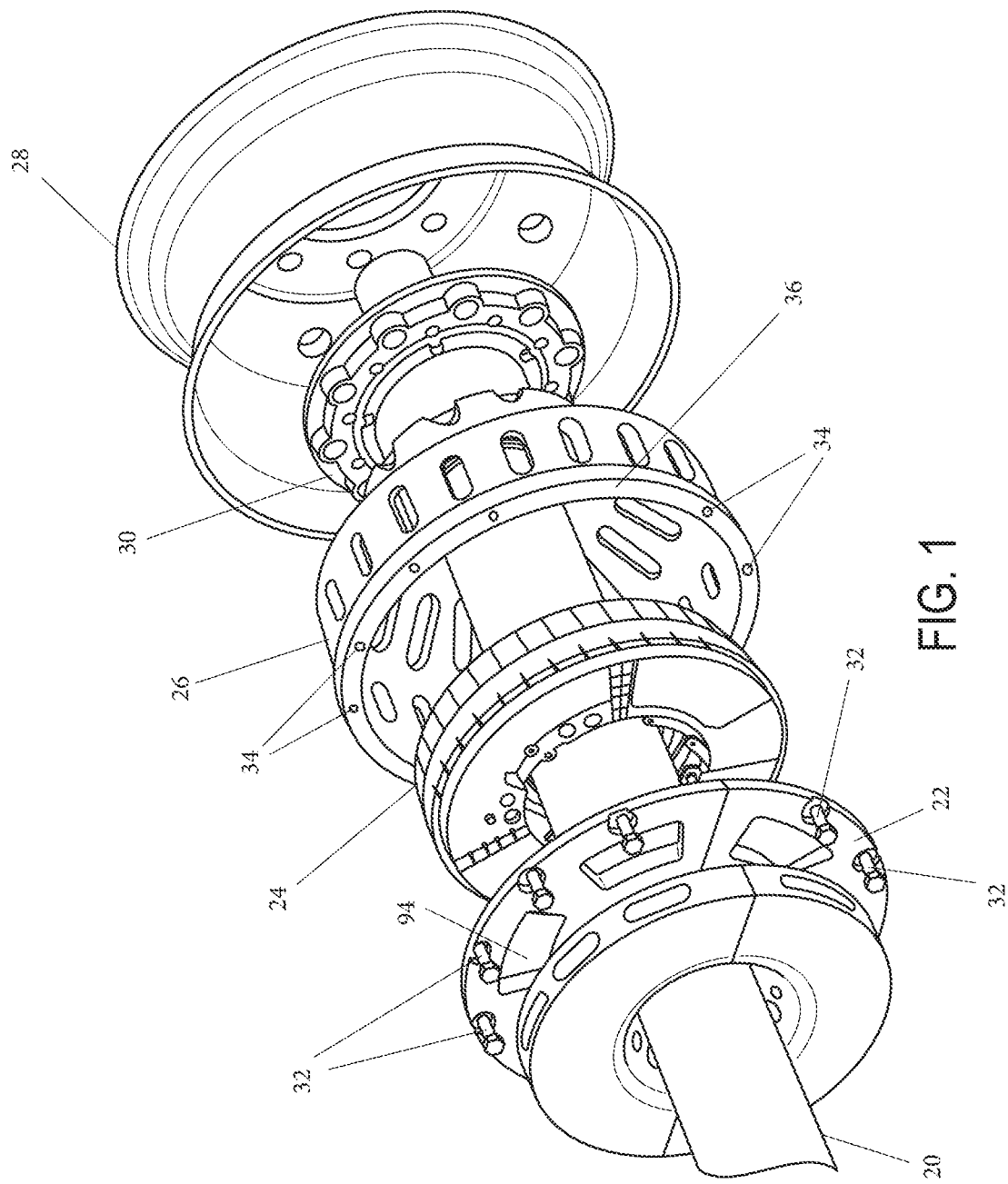
FIG. 1 is an exploded view schematically illustrating one possible installation procedure for a rotor assembly and an adaptor according to the invention used together with a motor, a hub, an axle, and a rim.

In the particular embodiment illustrated by way of example in FIG. 1, an end or extension of a non-rotatable axle tube 20 projects through a rotor assembly 22 formed from multiple pieces to be described. By way of a suitable flange or other connection (not shown) secured to an end of or around the circumferential outer surface of the non-rotatable axle tube 20, the envelope or housing 24 of au electric motor is fixed to the axle tube 20 by way of bolts or other appropriate fasteners extending through motor envelope mounting holes 38 (FIGS. 2 and 3), which are included at a radially inner section of the motor envelope 24. In one of several ways to be described, the rotor assembly 22, an adaptor 26 for the rotor assembly 22, a vehicle wheel rim 28, and a wheel huh 30 are all secured together for joint rotation with respect to the axle tube 20 and the motor envelope or housing 24. The adaptor 26, in other words, is utilized to secure the rotor assembly 22 to the vehicle wheel rim 28 and the hub 30 for rotation together with the rim 28 and the hub 30. Also illustrated in FIG. 1 are voids 94 in a base of the rotor assembly, for weight reduction and ventilation purposes to be discussed, as well as bolts 32 receivable in bores 34 in an axial end 36 of the adaptor 26. These bolts 32 serve to secure the multiple piece, rotor assembly 22 to the axial end 36 of the adaptor 26.

Figure 2:
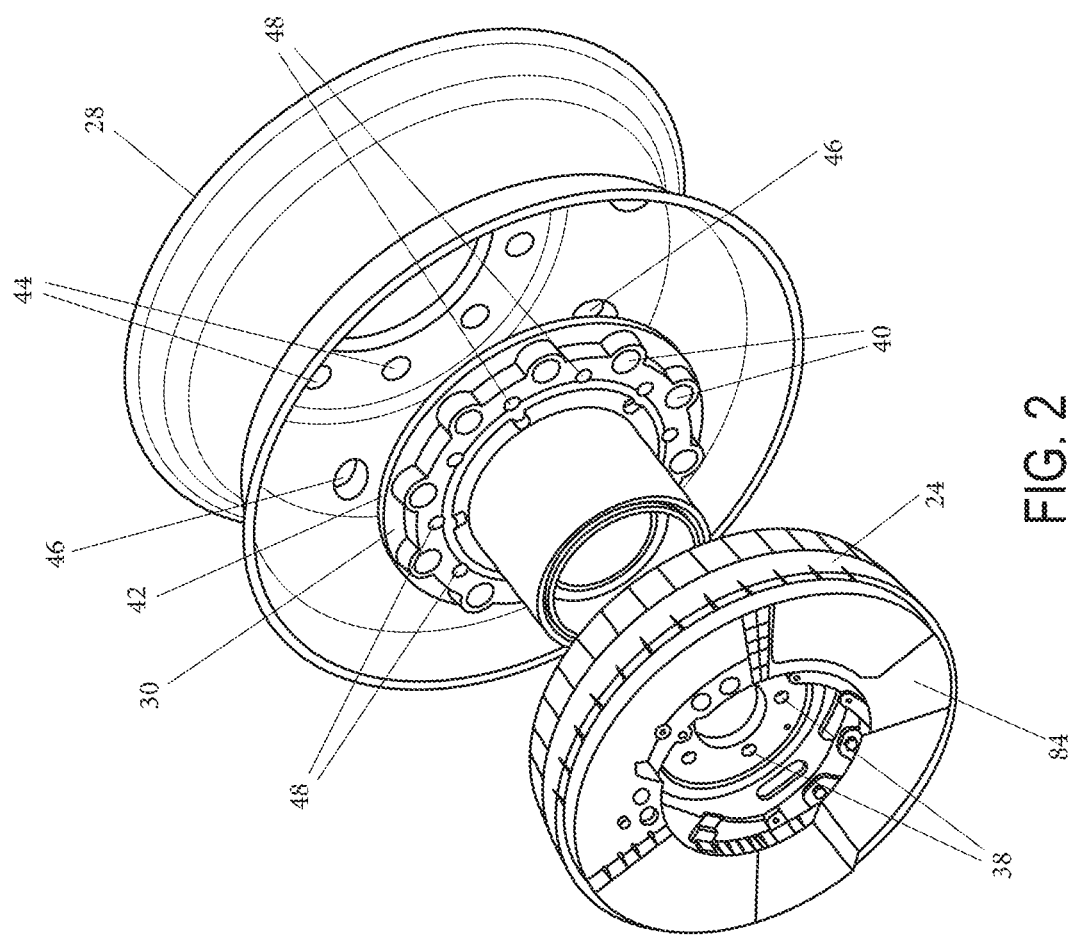
FIG. 2 is an exploded view of the motor, the hub, and the rim shown in FIG. 1, without the axle, the rotor assembly, the adaptor, or the axle.

FIG. 2 illustrates the motor envelope or housing 24 including the mounting holes 38 at the envelope radially inner section, as well as the wheel rim 28 and the hub 30, in an exploded view, with other elements mentioned in connection with FIG. 1 removed. A series of holes 40 are distributed about a base 42 of the hub 30. These holes 40 are to align with corresponding holes 44 in the rim 28 so that bolts passing through the aligned holes 40 and 44 can secure the rim 28 and the hub 30 together. The base 42 of the hub 30 additionally includes another series of holes 48 distributed about the hub base 42. In the particular arrangement shown in FIGS. 1-4, each hole 48 in this other series of holes is to align with a corresponding threaded hole 60 (FIG. 4) at an axial end 53 of the adaptor 26 to join the adaptor 26 and the hub 30 together. The wheel rim 28 shown further includes optional openings 46 for ventilation and weight reduction purposes.

Figure 3:
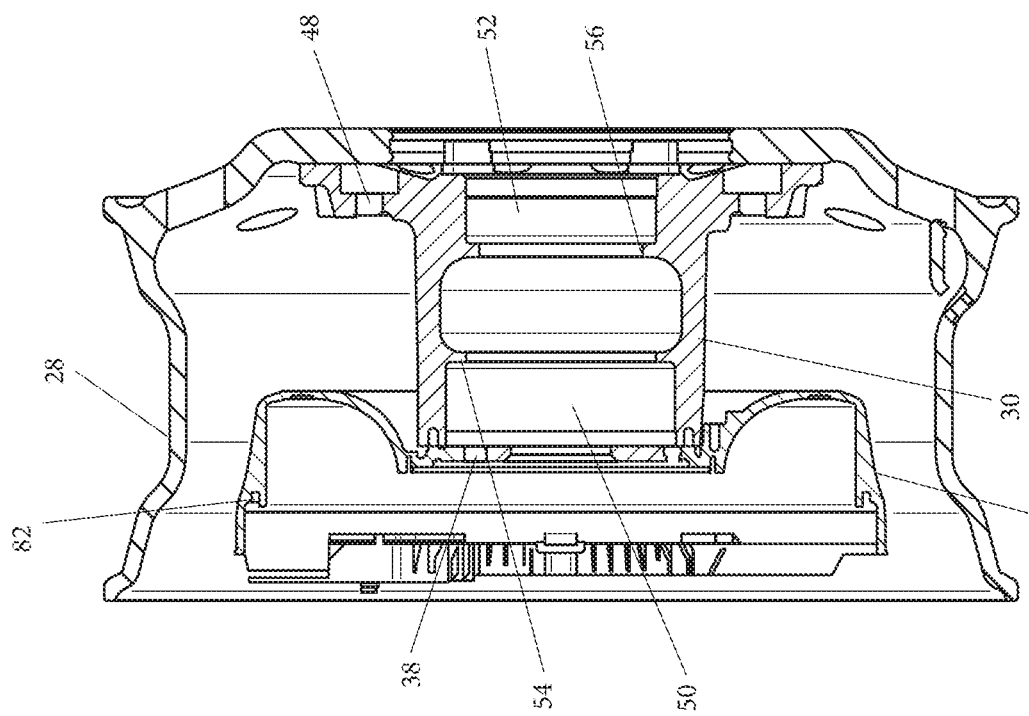
FIG. 3 is a cross sectional side view of the hub, the rim, and part of an envelope for the motor shown in FIGS. 1 and 2 in an assembled condition.

A suitable bearing arrangement (not shown) rotatably mounts the hub 30 at its appropriate axial location relative to the axle tube 20. Referring to the hub shown in cross section in FIG. 3, opposite axial ends of the hub include respective recesses 50 and 52 with end stop flanges 54 and 56 at their adjacent innermost ends. The end stop flanges 54 and 56 serve to properly position respective outer rings of bearings that are press-fit or otherwise secured within the axial recesses 50 and 52 to permit relative rotation between the hub 30, with the rim 28 attached, and the axle 20, having the motor envelope 24 attached via the bolts and mounting holes 38 mentioned, when an overall wheel arrangement including the elements mentioned is in use. The flanges 54 and 56 act as axial stops for the outer bearing rings, and the overall bearings, properly positioned in this way, can thus provide for rotation of the rotor assembly 22, the adaptor 26, the rim 28, and the hub 30, under the influence of the electric motor enclosed within the motor envelope 24, relative to the axle tube 20. As also shown in FIG. 3, at an inboard end, the motor envelope 24 includes a recess 82 in which a corresponding protrusion formed around the rim of a cover 84 for the motor envelope 24 can be snap fit or otherwise secured to fix the cover 84 (FIG. 2) and the motor envelope 24 together. Such an arrangement serves to protect components of the electric motor (not shown) disposed in the motor envelope from contamination.

Figure 4:
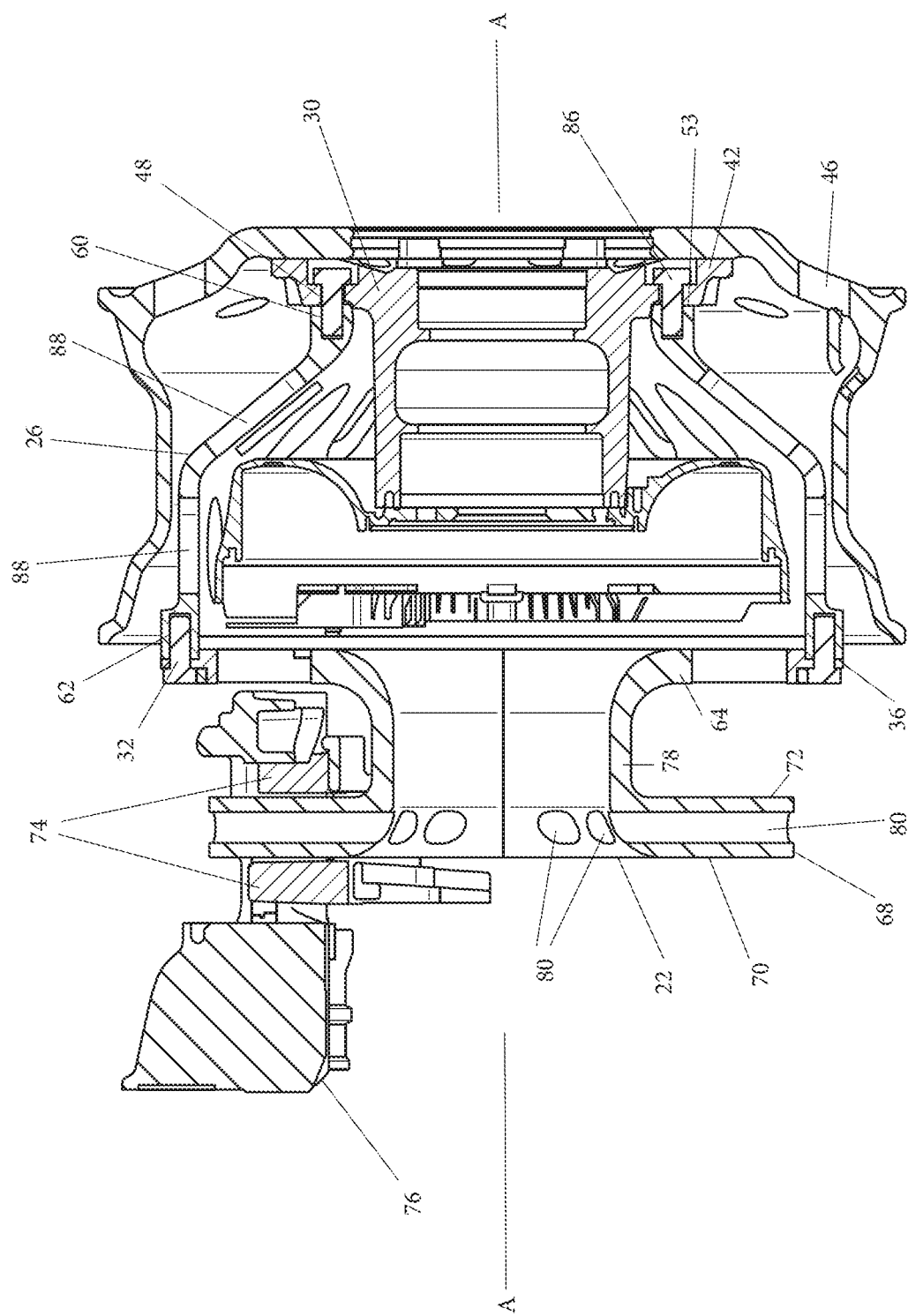
FIG. 4 is a cross sectional view illustrating a fluid or electrically operated caliper brake arrangement used together with a rotor assembly and an adaptor according to the invention, with the adaptor surrounding a part of the envelope for the motor and secured to the hub and the rim.

FIG. 4 shows the rotor assembly 22 formed from multiple pieces as attached by the bolts 32 mentioned to one axial end 36 of the adaptor 26. In the arrangement shown in FIG. 4, the axial end 36 is an inboard adaptor end formed by an enlarged rim of the adaptor 26. Each bolt 32 is received in an appropriate bore 62 formed in the enlarged adaptor rim. The rotor assembly 22 includes an attachment base 64, an engagement portion 68 including surfaces 70 and 72 to be contacted by friction pads 74 of a suitable brake assembly 76, and an intermediate section 78 extending along a rotor assembly axis of rotation A-A and interconnecting the attachment base 64 and the and the engagement portion 68. Adaptor 26 thus permits mounting of the rotor assembly 22 having the mounting features mentioned directly on the hub 30 with a familiar assembly process. The rotor assembly 22 works with a currently suitable brake assembly 76. No brake redesign is required, and there are no ground clearance concerns present. By way of optional passages 80, and by way of openings 88 in the adaptor 26, both the rotor assembly 22 and the adaptor 26 may be slotted to reduce weight and for ventilation by permitting for air flow around the motor received within the envelope or housing 26 as well as other components to improve cooling. The adaptor 26 may be steel or aluminum and extends between the base 42 of the wheel hub 30 and the attachment base 64 of the rotor assembly 22, so that, by way of the adaptor 26, the rotor assembly 22 is securable to the wheel hub 30. Once mounted in place, the adaptor 26 defines an internal volume within which a housing 24 for the electric motor and at least a portion of the wheel hub 30 are receivable.

Figure 5:
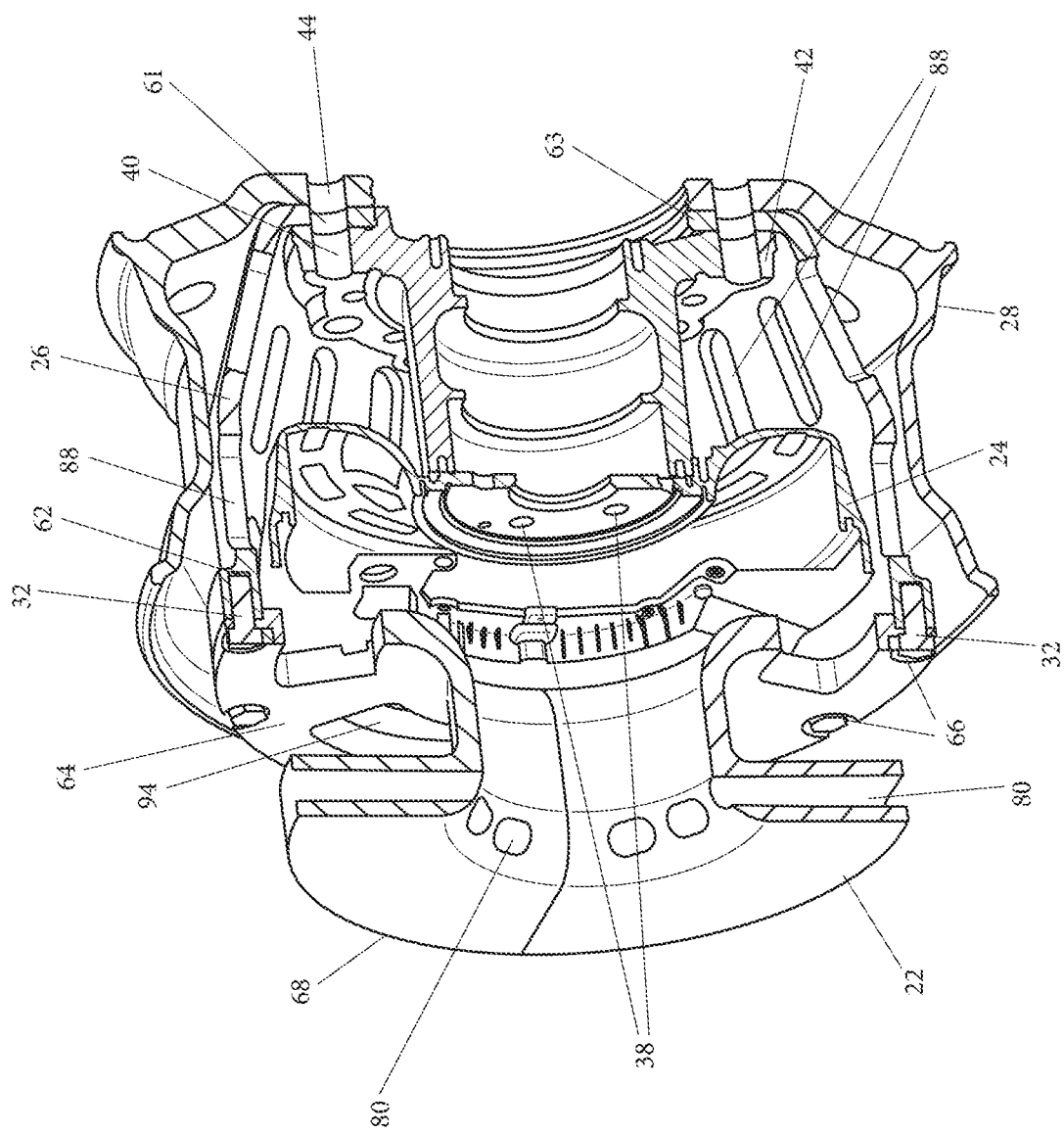
FIG. 5 illustrates a modified interface between the adaptor, the hub, and the rim, as well as part of the motor envelope and the rotor assembly secured to the adaptor.

FIG. 5 illustrates the attachment base 64 as provided with holes 66 permitting passage of the bolts 32 into the bores 62 to secure the attachment base 64, and thus the overall rotor assembly 22, to the adaptor 26. The friction pad engagement portion 68 of the rotor assembly 22 illustrated includes the optional ventilation passages 80 mentioned to assist in cooling the rotor assembly 22 when the assembly is in use. FIG. 5 additionally shows the mounting holes 38 by which the electric motor envelope or housing 24 is fixed to the axle tube 20 using bolts or other appropriate fasteners in the manner mentioned previously.

The configuration illustrated in FIG. 4 differs slightly from the configuration illustrated in FIG. 5 in how the adaptor 26 attaches to the wheel rim 28 and the hub 30. In both of the configurations shown in FIGS. 4 and 5, bolts, such as the bolts 86 shown in FIG. 4, are inserted through the holes distributed about the hub base 42. However, in the arrangement shown in FIG. 4, each bolt 86 extends from an outboard side of the hub base 42, through one of the holes 48 in the hub base 42, and into one of the threaded holes 60 in the adaptor 26 aligned with the holes 48, without involving the wheel rim 28.

Referring again to FIG. 1, the wheel rim 28 is separately secured to the hub 30 by bolts passing through the holes 44 in the rim 28 and the holes 40 distributed about the base 42 of the hub 30, so that the hub 30 is sandwiched by way of its base 42 between the vehicle wheel rim 28 and the adaptor 26. In the arrangement shown in FIG. 5, by contrast, bolts will extend from an outboard side of the wheel rim 28, through the holes 44 in the rim 28, through a hole 61 provided in a circular end flange 63 of the adaptor 26, and then into one of the holes 40 in the hub base 42, so that the adaptor 26 is sandwiched by way of its end flange 63 between the wheel rim 28 and the hub 30. By way of the arrangement shown in FIG. 5, in other words, the adaptor interface is sandwiched between the hub 30 and the wheel rim 28, allowing for wheel studs to be used for mounting the adaptor 26. The other series of holes 48 distributed about the hub base 42 may thus be omitted in the configuration illustrated in FIG. 5. Voids 94 are additionally provided in the rotor assembly attachment base 64 for weight reduction and ventilation purposes.

Figure 6:
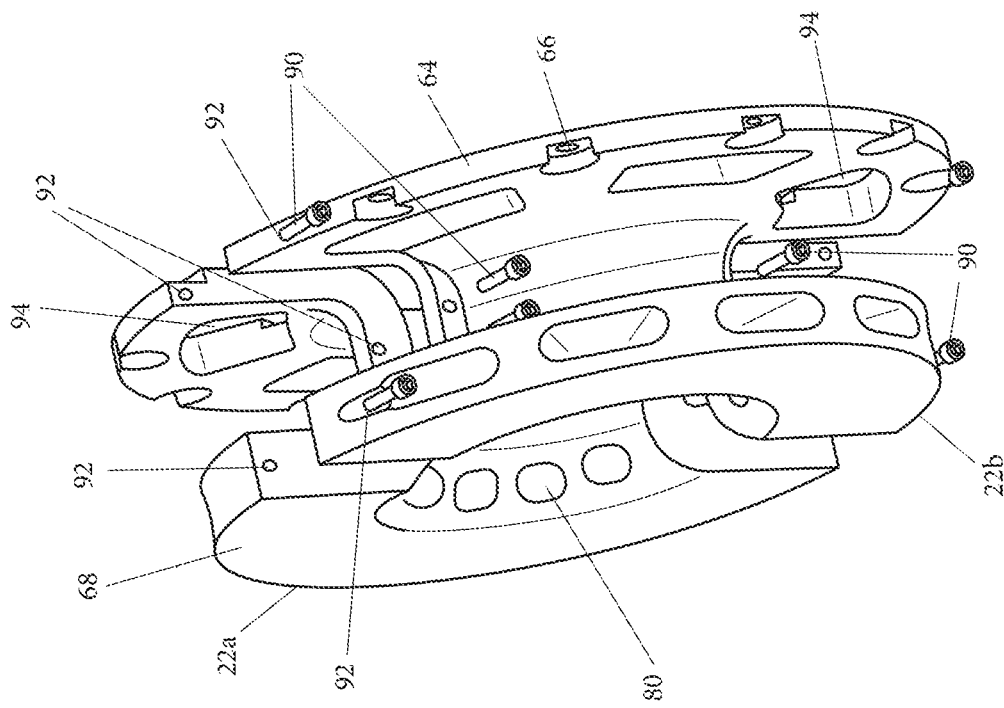
FIG. 6 is a view showing separate parts of the rotor assembly as well as fasteners used to secure those separate parts together.

One configuration of the multiple piece rotor assembly 22, itself, is illustrated in FIG. 6. The rotor assembly 22 shown in FIG. 6 includes a first rotor assembly half 22a, a second rotor assembly half 22b, and rotor half connection elements, here illustrated as screws or bolts 90. Each screw or bolt 90 is received in an aligned set of bores 92 provided in the first and second rotor assembly halves 22a and 22b to join those halves together. The illustration supplied by FIG. 6 also shows the ventilation passages 80 in the rotor assembly engagement portion 68, as well as voids 94 provided in the rotor assembly attachment base 64, serving the weight reduction and ventilation purposes mentioned. Here, the rotor assembly 22, having the multiple rotor assembly pieces, is formed by the rotor assembly halves 22a and 22b, joined together with fasteners. These multiple rotor assembly pieces may be cast iron pieces and include the rotor sections 22a, 22b, defining the engagement portion 68 having the surfaces 70, 72 to be contacted by friction pads 74. The rotor assembly 22 further includes the attachment base 64 and an intermediate section 78, surrounding a rotor assembly axis A of rotation and extending along the rotor assembly axis of rotation A between the engagement portion 68 and the attachment base 64.

Figure 7:
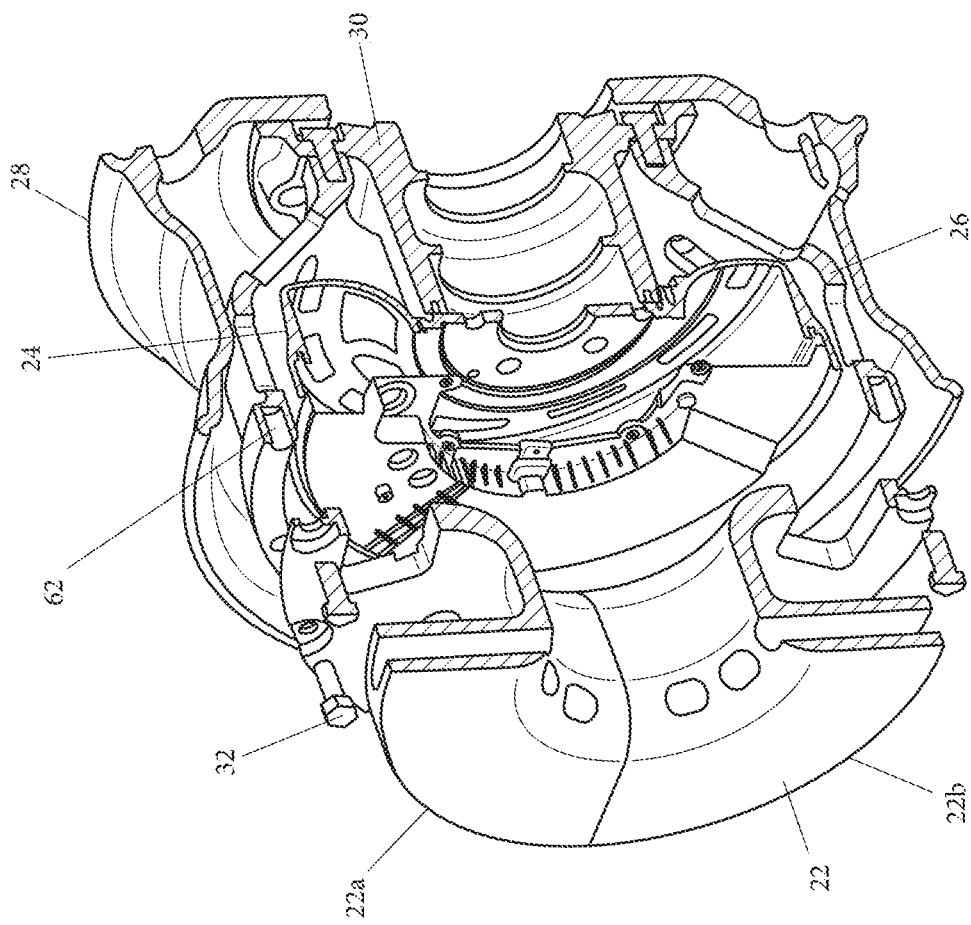
FIG. 7 is a partially exploded sectional view showing the rotor assembly as separate and removable from the adaptor and other elements located at an axle end, including the motor envelope, the hub, and the rim.

FIG. 7 is similar to FIG. 5, but shows the bolts 32 as they are being inserted into bores 62 formed in the adaptor rim providing an interface with the adaptor for connection of the rotor assembly 22. Again, the rotor assembly 22 separates into the two halves 22a and 22b identified. The bolts 32 provide a selectively engagable and disengageable connection between the rotor assembly 22 and the envelope or housing 26. Quick and easy separation of the rotor assembly 22 from all other elements of the overall axle end arrangement, including the adaptor 26, the electric motor envelope or housing 24, the hub 30, the axle 20 itself, and the rim 28, simply by unscrewing the bolts 32 and the screws or bolts 90, is permitted without removal of any of the other components mentioned.

Figure 8:
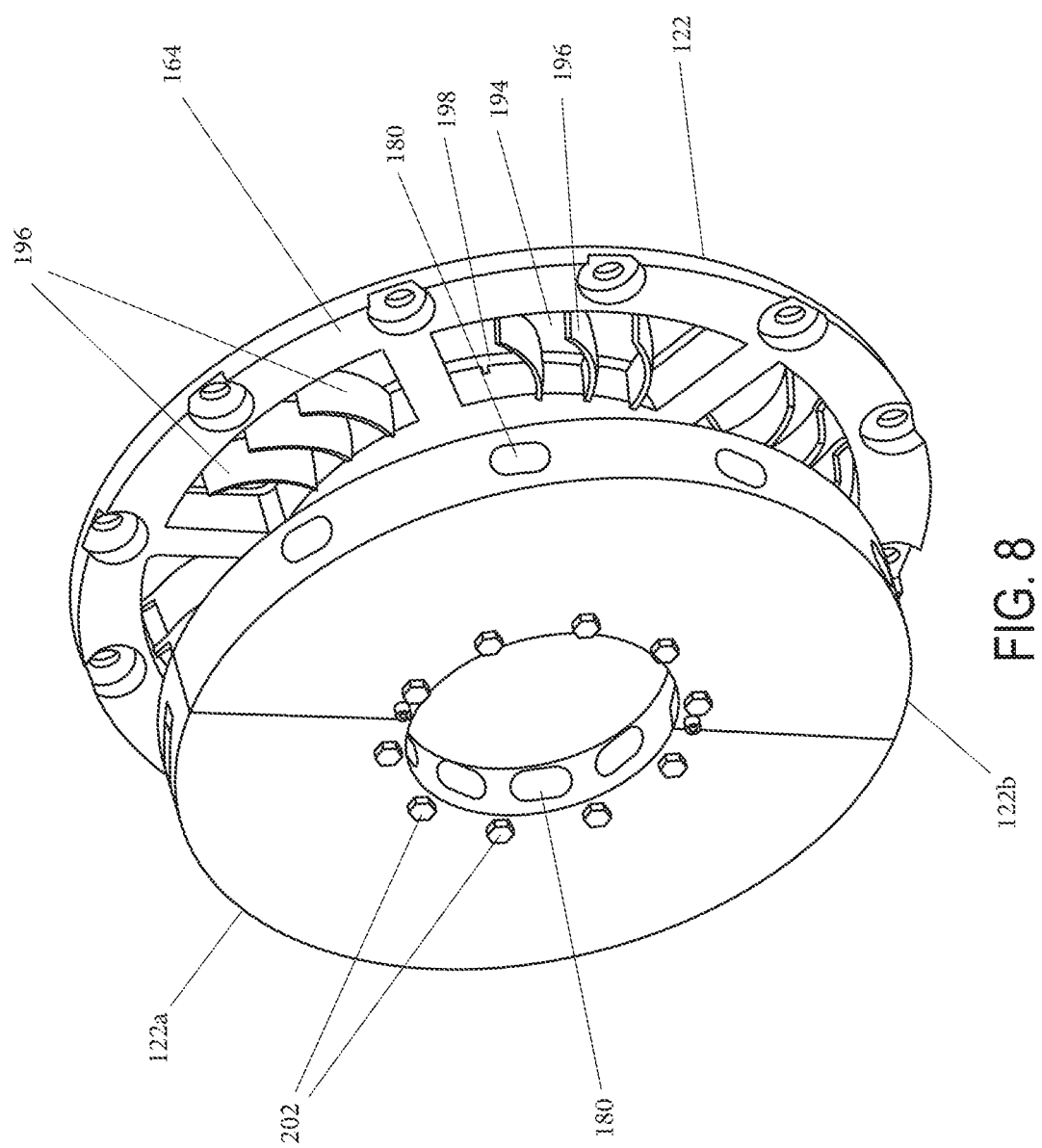
FIG. 8 is a view showing a set of rotor blades secured to the rotor assembly.

FIG. 8 illustrates a modified rotor assembly 122, providing forced air ventilation to other elements of the axle end arrangement. The other elements of the axle end arrangement mentioned are not shown in FIG. 8. The modified rotor assembly 122 includes rotor halves 122a and 122b, ventilation passages 180, and an attachment base 164. In this assembly, rotor blades 196, disposed in voids 194, can be added to the rotor assembly to increase air flow around the motor (not shown in FIG. 8) to further improve motor cooling. In other words, the rotor blades 196 add forced air around the motor to reduce cooling requirements that would otherwise have to be implemented by other means. A retaining ring 198 may be used to clamp tabs formed on the rotor blades 196 against the attachment base 164 in place.

Exploded views of the modified rotor assembly 122 are supplied by FIGS. 9 and 10. The assembly 122 shown includes the rotor halves 122a and 122b, the attachment base 164, the rotor blades 196, and the retaining ring 198. Also shown in FIG. 9 are the tabs 200 formed on the rotor blades 196 permitting the blades 196 to be clamped by the retaining ring 198 against the rotor attachment base 164. In this particular assembly, the rotor halves 122a and 122b are detachable from the intermediate section 178 interconnecting the attachment base 164 and the engagement portion famed by the rotor halves. Screws or bolts 202 are used to connect the rotor halves 122a and 122b, the attachment base 164, the retaining ring 198, and the rotor blades 196 together to form the overall rotor assembly 122. As best illustrated in FIGS. 10 and 11, the tabs 200 may be inserted into approximately radial slots 204, cut or otherwise formed in the rotor attachment base 164, to locate the rotor blades 196 around the rotor assembly 122, while the retaining ring 198 is then bolted onto the rotor attachment base 164 to secure the blades axially.

Figure 13:
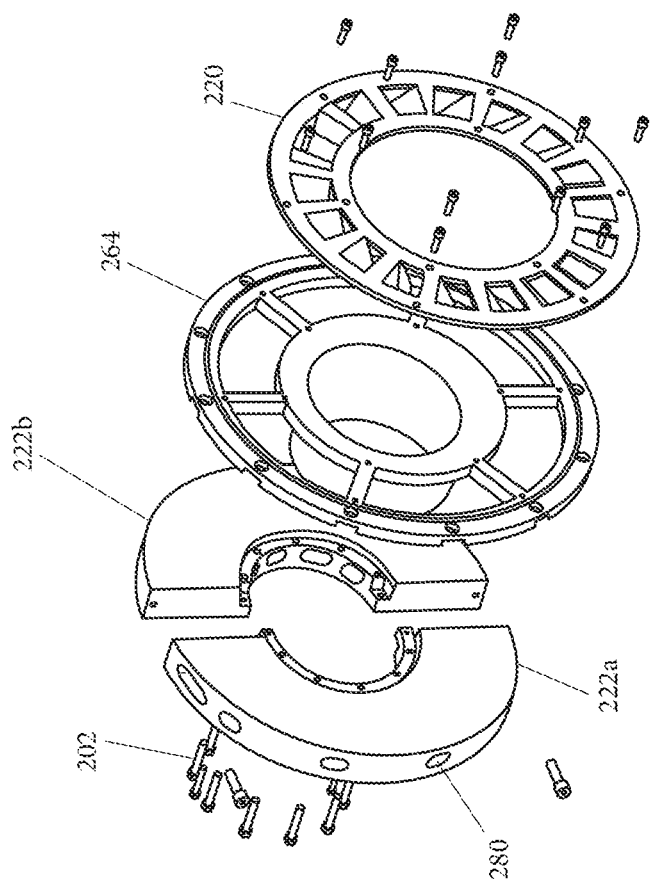
FIG. 13 is a view similar to FIG. 12 but showing the components from a different angle.
Figure 12:
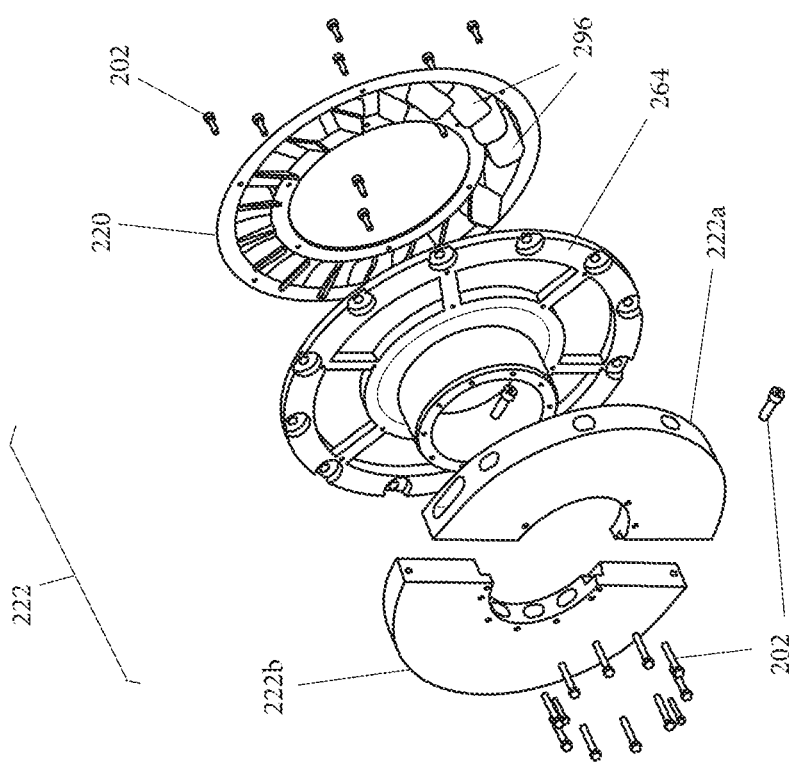
FIG. 12 is an exploded view similar to FIG. 9 but showing an alternative rotor blade structure eliminating the need for a retaining ring.

FIGS. 12 and 13 are views of another rotor assembly 222 that is nearly the same as that shown in FIGS. 8-10, except that the structures and functions of the retaining ring 198 and the rotor blades 196 shown in FIGS. 8-10 are consolidated using a single stamped metal element 220 having rotor blades 296. Again, the rotor blades 296 add forced air around the motor to reduce cooling requirements that would otherwise have to be implemented by other means. By having the element 220 with the rotor blades 296 stamped out of one sheet of metal, the number of components is reduced, and assembly time is improved. Again, screws or bolts 202 are used to connect the rotor halves 222a and 222b, the attachment base 264, and the single stamped metal element 220 having the rotor blades 296 together to form the overall rotor assembly 222.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A brake disc arrangement to be located at an end of an axle of a vehicle capable of being driven by an associated electric motor disposed adjacent to an associated wheel hub of the vehicle, the brake disc arrangement providing for braking an individual vehicle wheel to be driven by the electric motor and comprising:

a rotor assembly having multiple rotor assembly pieces joined together with fasteners, the multiple rotor assembly pieces including rotor sections defining an engagement portion having surfaces to be contacted by friction pads, the rotor assembly further including an attachment base, and an intermediate section, surrounding a rotor assembly axis of rotation and extending along the rotor assembly axis of rotation between the engagement portion and the attachment base, and a brake disc adaptor, extending between a base of the associated wheel hub and the attachment base of the rotor assembly, by which the rotor assembly is securable to the associated wheel hub, the adaptor defining an internal volume within which a housing for the associated electric motor and at least a portion of the associated wheel hub are receivable, wherein at least one of the rotor assembly and the adaptor includes slots to ventilate around the motor received within the internal volume to improve cooling.

2. The brake disc arrangement according to claim 1, wherein the rotor assembly pieces include a pair of rotor assembly halves, with each of said rotor assembly halves integrally formed with halves of said attachment base and said intermediate section.

3. The brake disc arrangement according to claim 1, wherein the rotor assembly pieces include a pair of rotor assembly halves, with each of the rotor assembly halves attached by fasteners to the intermediate section and the attachment base.

4. The brake disc arrangement according to claim 1, further comprising rotor blades secured to the attachment base.

5. The brake disc arrangement according to claim 4, wherein the rotor blades are clamped against the attachment base by a retaining ring.

6. The brake disc arrangement according to claim 5, wherein each of the rotor blades includes at least one tab by which the rotor blades are clamped by the retaining ring against the attachment base.

7. The brake disc arrangement according to claim 4, wherein the rotor blades form part of an integrally formed, single element connected to the attachment base.

8. The brake disc arrangement according to claim 1, wherein the wheel hub is sandwiched between a rim of the individual vehicle wheel to be driven by the electric motor and an axial end of the adaptor.

9. The brake disc arrangement according to claim 1, wherein the adaptor includes an end flange sandwiched between said base of the wheel hub and a rim of the individual vehicle wheel to be driven by the electric motor.

10. The brake disc arrangement according to claim 1, wherein the multiple rotor assembly pieces are cast iron pieces, and the brake disc adaptor is steel or aluminum.

11. The brake disc arrangement according to claim 1, wherein the brake disc adaptor fully encapsulates the associated electric motor and does not contact the electric motor.

12. The brake disc arrangement according to claim 4, wherein the rotor blades increase air flow around the associated electric motor when the vehicle is in motion.

13. A vehicle to be driven by an electric motor disposed adjacent to at least one wheel hub of the vehicle having a brake disc arrangement located at an end of an axle of the vehicle, the brake disc arrangement providing for braking an individual vehicle wheel to be driven by the electric motor, the brake disc arrangement comprising:

a rotor assembly having multiple rotor assembly pieces joined together with fasteners, the multiple rotor assembly pieces including rotor sections defining an engagement portion having surfaces to be contacted by friction pads, the rotor assembly further including an attachment base, and an intermediate section, surrounding a rotor assembly axis of rotation and extending along the rotor assembly axis of rotation between the engagement portion and the attachment base, and an adaptor, extending between a base of the wheel hub and the attachment base of the rotor assembly, by which the rotor assembly is securable to the wheel hub, the adaptor defining an internal volume within which a housing for the electric motor and at least a portion of the wheel hub are receivable, wherein at least one of the rotor assembly and the adaptor includes slots to ventilate around the motor received within the internal volume to improve cooling.

14. The vehicle according to claim 13, wherein the rotor assembly pieces include a pair of rotor assembly halves, with each of said rotor assembly halves integrally formed with halves of said attachment base and said intermediate section.

15. The vehicle according to claim 14, wherein the rotor assembly pieces include a pair of rotor assembly halves, with each of the rotor assembly halves attached by fasteners to the intermediate section and the attachment base.

16. The vehicle according to claim 15, further comprising rotor blades secured to the attachment base.

17. The vehicle according to claim 16, wherein the rotor blades are clamped against the attachment base by a retaining ring.

18. The vehicle according to claim 17, wherein each of the rotor blades includes at least one tab by which the rotor blades are clamped by the retaining ring against the attachment base.

19. The vehicle according to claim 16, wherein the rotor blades form part of an integrally formed, single element connected to the attachment base.

20. A process of assembling a brake disc arrangement to be located at an end of an axle of a vehicle driven by an electric motor disposed adjacent to a wheel hub of the vehicle, the brake disc arrangement providing for braking an individual vehicle wheel to be driven by the electric motor and comprising:

assembling the electric motor to the wheel hub;
sliding the wheel hub on the axle;
securing an adaptor to at least one of the wheel hub and the individual vehicle wheel;
joining multiple rotor assembly pieces, including rotor sections defining an engagement portion having surfaces to be contacted by friction pads, an attachment base, and an intermediate section, together with fasteners to form a rotor assembly, so that the intermediate section surrounds a rotor assembly axis of rotation and extends along the rotor assembly axis of rotation between the engagement portion and the attachment base; and
attaching the rotor assembly to the adaptor, to extend between a base of the wheel hub and the attachment base of the rotor assembly, to enclose a housing of the electric motor within an internal volume within which the housing of the electric motor and at least a portion of the wheel hub are receivable.

21. A process of assembling a brake disc arrangement to be located at an end of an axle of a vehicle driven by an electric motor disposed adjacent to a wheel hub of the vehicle, the brake disc arrangement providing for braking an individual vehicle wheel to be driven by the electric motor and comprising:
- securing an adaptor to the wheel hub;
- assembling the electric motor to the wheel hub;
- sliding the wheel hub on the axle;
- joining multiple rotor assembly pieces, including rotor sections defining an engagement portion having surfaces to be contacted by friction pads, an attachment base, and an intermediate section, together with fasteners to form a rotor assembly, so that the intermediate section surrounds a rotor assembly axis of rotation and extends along the rotor assembly axis of rotation between the engagement portion and the attachment base;
- attaching the rotor assembly to the adaptor, to extend between a base of the wheel hub and the attachment base of the rotor assembly, to enclose a housing of the electric motor within an internal volume within which the housing of the electric motor and at least a portion of the wheel hub are receivable; and
- attaching a rim of the individual vehicle wheel to the wheel hub.

\* \* \* \* \*